United States Patent
Niemi et al.

(10) Patent No.: US 11,147,125 B2
(45) Date of Patent: Oct. 12, 2021

(54) APPARATUSES AND METHODS FOR HANDLING LOCATION INFORMATION

(71) Applicant: MediaTek Singapore Pte. Ltd., Singapore (SG)

(72) Inventors: Marko Niemi, Oulu (FI); Ting-Wen Chen, Hsinchu (TW); Chien-Chun Huang-Fu, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 58 days.

(21) Appl. No.: 16/809,686

(22) Filed: Mar. 5, 2020

(65) Prior Publication Data
US 2020/0288537 A1 Sep. 10, 2020

Related U.S. Application Data

(60) Provisional application No. 62/813,804, filed on Mar. 5, 2019.

(51) Int. Cl.
| | |
|---|---|
| *H04W 88/06* | (2009.01) |
| *H04W 36/14* | (2009.01) |
| *H04W 36/00* | (2009.01) |
| *H04W 48/16* | (2009.01) |
| *H04W 76/16* | (2018.01) |
| *H04W 48/18* | (2009.01) |
| *H04W 12/30* | (2021.01) |

(52) U.S. Cl.
CPC ........... *H04W 88/06* (2013.01); *H04W 12/35* (2021.01); *H04W 36/0022* (2013.01); *H04W 36/14* (2013.01); *H04W 48/16* (2013.01); *H04W 48/18* (2013.01); *H04W 76/16* (2018.02)

(58) Field of Classification Search
CPC ..... H04W 88/06; H04W 12/35; H04W 36/14; H04W 36/0022; H04W 48/16; H04W 76/16; H04W 48/18; H04W 12/63; H04W 12/69; H04W 4/02; H04W 8/183
See application file for complete search history.

(56) References Cited

U.S. PATENT DOCUMENTS

| | | | |
|---|---|---|---|
| 8,804,554 | B2 | 8/2014 | Ruvalcaba et al. |
| 9,521,598 | B2 | 12/2016 | Nie et al. |
| 9,860,816 | B2 | 1/2018 | Komati et al. |

(Continued)

FOREIGN PATENT DOCUMENTS

| | | |
|---|---|---|
| CN | 103493515 A | 1/2014 |
| CN | 105050144 A | 11/2015 |

(Continued)

OTHER PUBLICATIONS

International Search Report and Written Opinion dated May 28, 2020, issued in application No. PCT/CN2020/078025.

*Primary Examiner* — Julio R Perez
(74) *Attorney, Agent, or Firm* — McClure, Qualey & Rodack, LLP

(57) ABSTRACT

A User Equipment (UE) including a Universal Integrated Circuit Card (UICC) and a Mobile Equipment (ME) is provided. The ME is coupled to the UICC, and is configured to determine whether the UICC supports a first RAT in response to the UE operating in a cell which utilizes the first RAT, and use a data object for a second RAT to accommodate location information for the first RAT in response to the UICC not supporting the first RAT.

20 Claims, 4 Drawing Sheets

(56) References Cited

U.S. PATENT DOCUMENTS

| | | | | |
|---|---|---|---|---|
| 2009/0046655 A1* | 2/2009 | Zhao | ................ | H04W 24/04 |
| | | | | 370/331 |
| 2015/0181639 A1* | 6/2015 | Liu | ................ | H04W 76/18 |
| | | | | 370/329 |
| 2016/0029199 A1* | 1/2016 | Shi | ................ | H04W 48/18 |
| | | | | 455/432.1 |
| 2017/0048773 A1* | 2/2017 | Miao | ................ | H04W 36/14 |

FOREIGN PATENT DOCUMENTS

| | | |
|---|---|---|
| CN | 108781405 A | 11/2018 |
| WO | 2015/195250 A1 | 12/2015 |

\* cited by examiner

APPARATUSES AND METHODS FOR HANDLING LOCATION INFORMATION

CROSS REFERENCE TO RELATED APPLICATIONS

This application claims priority of U.S. Provisional Application No. 62/813,804, filed on Mar. 5, 2019, the entirety of which is incorporated by reference herein.

BACKGROUND OF THE APPLICATION

Field of the Application

The application generally relates to information handling, and more particularly, to apparatuses and methods for handling location information.

Description of the Related Art

In a typical mobile communication environment, a User Equipment (UE) (also called Mobile Station (MS)), such as a mobile telephone (also known as a cellular or cell phone), or a tablet Personal Computer (PC) with wireless communications capability, may communicate voice and/or data signals to one or more service networks. The wireless communications between the UE and the service networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc.

These wireless technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In some cases, operators may deploy 5G services using existing 4G UMTS (Universal Mobile Telecommunications System) Subscriber Identity Modules (USIMs) which do not support of processing and storing 5G specific information. However, due to the specifications for 5G NR still being under discussion among 3GPP members, many details are not yet identified, including how to enable using a non-5G Universal Integrated Circuit Card (UICC) (e.g., USIM) in a 5G-capable UE. Consequently, the non-5G UICC may not be able to store or handle any 5G specific information, causing failures of interoperability between the Mobile Equipment (ME) and the UICC in the 5G-capable UE.

BRIEF SUMMARY OF THE APPLICATION

The present application proposes that, when the Universal Integrated Circuit Card (UICC) (e.g., a 4G USIM) does not support a first RAT (e.g., 5G NR), the Mobile Equipment (ME) of a UE may use a data object for a second RAT (e.g., 4G LTE) to accommodate location information for the first RAT, wherein the accommodation requires specific rules of processing and handling of the location information for the first RAT.

In one aspect of the application, a User Equipment (UE) comprising a UICC and an ME is provided. The ME is coupled to the UICC, and is configured to determine whether the UICC supports a first RAT in response to the UE operating in a cell which utilizes the first RAT, and use a data object for a second RAT to accommodate location information for the first RAT in response to the UICC not supporting the first RAT.

In another aspect of the application, a method for handling location information, executed by a UE comprising a UICC and an ME, is provided. The method comprises the steps of: determining, by the ME, whether the UICC supports a first RAT in response to the UE operating in a cell which utilizes the first RAT; and using, by the ME, a data object for a second RAT to accommodate location information for the first RAT in response to the UICC not supporting the first RAT.

Other aspects and features of the present application will become apparent to those with ordinarily skill in the art upon review of the following descriptions of specific embodiments of the UEs and the methods for handling location information.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
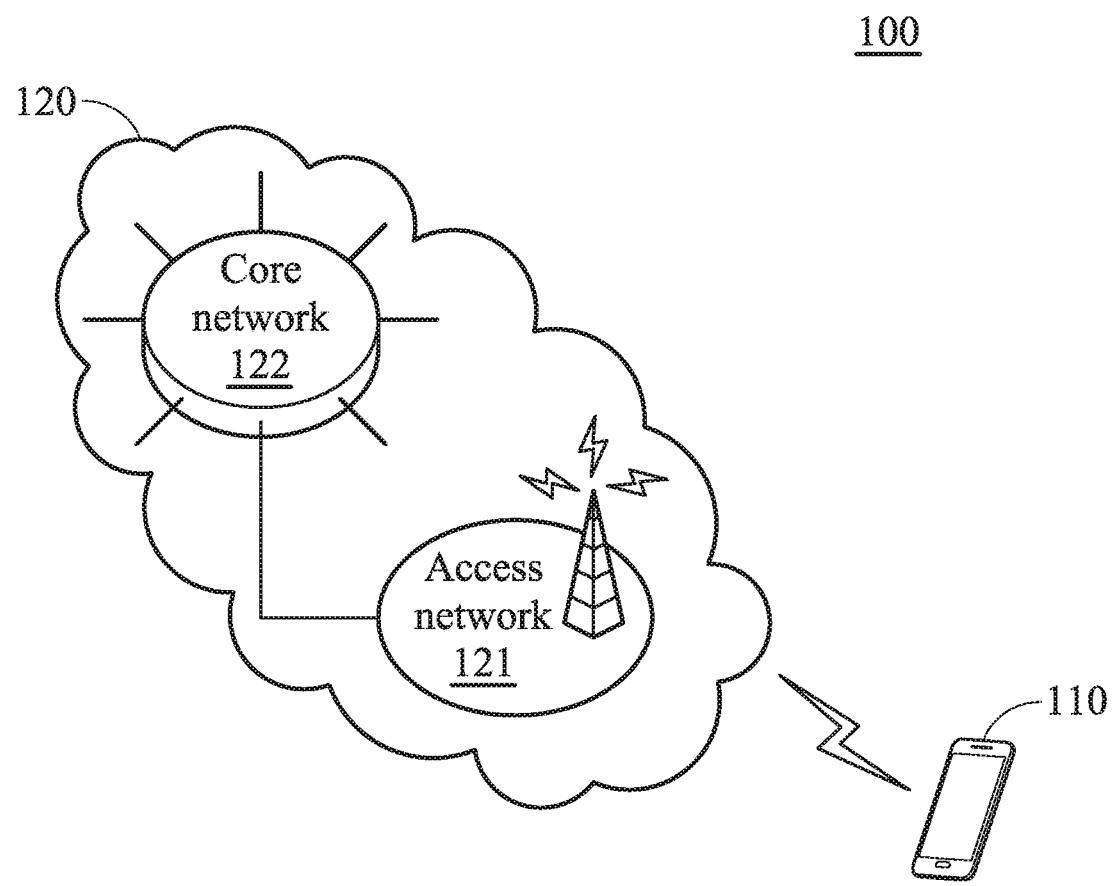
FIG. 1 is a block diagram of a wireless communication environment according to an embodiment of the application.

FIG. 1 is a block diagram of a wireless communication environment according to an embodiment of the application. As shown in FIG. 1, the wireless communication environment 100 may include a User Equipment (UE) 110 and a service network 120, wherein the UE 110 may be wirelessly connected to the service network 120 for obtaining mobile services.

The UE 110 may be a feature phone, a smartphone, a panel Personal Computer (PC), a laptop computer, or any wireless communication device supporting the cellular technology (e.g., the 5G NR technology) utilized by the service network 120. In another embodiment, the UE 110 may support more than one cellular technology. For example, the UE may support the 5G NR technology and a legacy 4G technology, such as the LTE/LTE-A/TD-LTE technology, or the WCDMA technology.

The service network 120 may include an access network 121 and a core network 122. The access network 121 is responsible for processing radio signals, terminating radio protocols, and connecting the UE 110 with the core network 122. The core network 122 is responsible for performing mobility management, network-side authentication, and interfaces with public/external networks (e.g., the Internet). The access network 121 and the core network 122 may each comprise one or more network nodes for carrying out said functions.

In one embodiment, the service network 120 may be a 5G NR network, and the access network 121 may be a Next Generation Radio Access Network (NG-RAN) and the core network 122 may be a Next Generation Core Network (NG-CN).

An NG-RAN may include one or more cellular stations, such as next generation NodeBs (gNBs), which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

A 5G cellular station may form one or more cells with different Component Carriers (CCs) for providing mobile services to the UE 110. For example, the UE 110 may camp on one or more cells formed by one or more gNBs or TRPs, wherein the cells which the UE 110 is camped on may be referred to as serving cells, including a Primary cell (Pcell) and one or more Secondary cells (Scells).

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

In another embodiment, the service network 120 may be a 4G LTE network, and the access network 121 may be an Evolved-Universal Terrestrial Radio Access Network (E-UTRAN) and the core network 122 may be an Evolved Packet Core (EPC).

An E-UTRAN may include one or more evolved NodeBs (eNBs) (e.g., macro eNBs, femto eNBs, or pico eNBs), wherein each eNB may be referred to as a 4G cellular station.

A 4G cellular station may form one or more cells with different CCs for providing mobile services to the UE 110. For example, the UE 110 may camp on one or more cells formed by one or more eNBs, wherein the cells which the UE 110 is camped on may be referred to as serving cells, including a Pcell and one or more Scells.

An EPC may include at least one Home Subscriber Server (HSS), Mobility Management Entity (MME), Serving Gateway (S-GW), and Packet Data Network Gateway (PDN-GW or P-GW).

The HSS is a central database that contains user-related and subscription-related information. The functions of the HSS include functionalities such as mobility management, call and session establishment support, user authentication and access authorization.

The MME is responsible for idle mode UE paging and tagging procedures including retransmissions. It is involved in the bearer activation/deactivation process and is also responsible for choosing the S-GW for the UE 110 at the initial attach and at time of intra-LTE handover involving Core Network (CN) node relocation. It is also responsible for user authentication (by interacting with the HSS) and generation/allocation of temporary identities to the UE 110. It is also the termination point in the network for ciphering/integrity protection for Non Access Stratum (NAS) signaling and handles the security key management.

The S-GW is responsible for routing and forwarding user data packets, while it also acting as the mobility anchor for the user plane during inter-eNB handovers and as the anchor for mobility between LTE and other 3GPP technologies The P-GW provides connectivity from the UE 110 to external PDNs by being the point of exit and entry of traffic for the UE 110. The PGW also provides the functions of policy enforcement, packet filtering for each user, charging support, lawful interception, and packet screening.

It should be understood that the wireless communication environment 100 described in the embodiment of FIG. 1 are for illustrative purposes only and are not intended to limit the scope of the application. For example, the wireless communication environment 100 may include both a 5G NR network and a legacy network (e.g., a 4G LTE network), and the UE 110 may be wirelessly connected to both of the 5G NR network and the legacy network.

Figure 2:
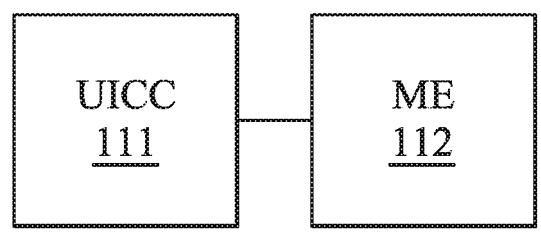
FIG. 2 is a block diagram illustrating the UE 110 according to an embodiment of the application.

FIG. 2 is a block diagram illustrating the UE 110 according to an embodiment of the application.

As shown in FIG. 2, the UE 110 may include a Universal Integrated Circuit Card (UICC) 111 and a Mobile Equipment (ME) 112, wherein the ME 112 is coupled to the UICC 111.

The UICC 111 may include a plurality of Elementary Files (EFs) for storing information, including subscriber information (e.g., the International Mobile Subscriber Identity (IMSI)/Temporary Mobile Subscriber Identity (TMSI), and access class information, etc.), security information (e.g., encoding algorithm, and encoding parameters, etc.), location information, and others.

The UICC 111 is also called a UMTS Subscriber Identity Module (USIM), CDMA SIM (CSIM), or SIM card, depending on the RAT in use. For example, in 4G LTE system, the UICC 111 may be called a USIM.

In one embodiment, the UICC 111 may be a USIM card even when the UE 110 is currently registered with a 5G NR network. That is, the UE 110 is a 5G-capable UE using a non-5G UICC.

The ME 112 is a mobile station which processes an actual communication with the service network 120.

Each of the UICC 111 and the ME 112 may include a USIM Application Toolkit (USAT) which enables the communications between the UICC 111 and the ME 112. For example, the UICC 111 may request, via the USAT, the ME 112 to provide location information (e.g., Tracking Area Code (TAC), and E-UTRAN Cell Identifier (ECI)/NR Cell Identifier (NCI), etc.) when the UE 110 is registered with the service network 120.

Figure 3:
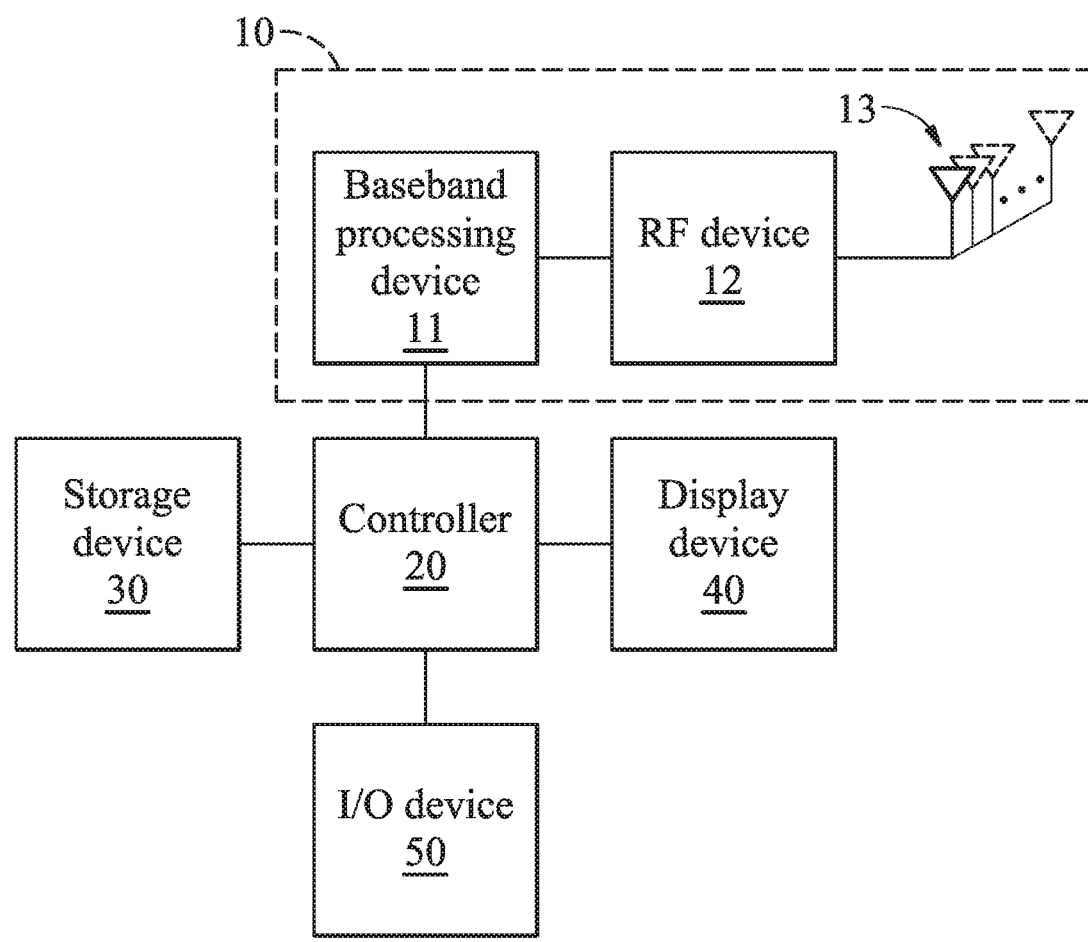
FIG. 3 is a block diagram illustrating the ME 112 according to an embodiment of the application.

FIG. 3 is a block diagram illustrating the ME 112 according to an embodiment of the application.

As shown in FIG. 3, the ME 112 may include a wireless transceiver 10, a controller 20, a storage device 30, a display device 40, and an Input/Output (I/O) device 50.

The wireless transceiver 10 is configured to perform wireless transmission and reception to and from the cells formed by one or more cellular stations of the access network 121.

Specifically, the wireless transceiver 10 may include a baseband processing device 11, a Radio Frequency (RF) device 12, and antenna(s) 13, wherein the antenna(s) 13 may include one or more antennas for beamforming.

The baseband processing device 11 is configured to perform baseband signal processing. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna(s) 13, convert the received RF wireless signals to baseband signals, which are processed by the baseband processing device 11, or receive baseband signals from the baseband processing device 11 and convert the received baseband signals to RF wireless signals, which are later transmitted via the antenna(s) 13. The RF device 12 may also contain multiple hardware devices to perform radio frequency conversion. For example, the RF device 12 may comprise a mixer to multiply the baseband signals with a carrier oscillated in the radio frequency of the supported cellular technologies, wherein the radio frequency may be any radio frequency (e.g., 30 GHz-300 GHz for mmWave) utilized in the 5G NR technology, or may be 900 MHz, 2100 MHz, or 2.6 GHz utilized in LTE/LTE-A/TD-LTE technology, or another radio frequency, depending on the cellular technology in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the cells formed by cellular station of the access network 121, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method for handling location information.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications (e.g., USAT), communication protocols, and/or the method for handling location information.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MIMI) for interaction with users.

It should be understood that the components described in the embodiment of FIG. 3 are for illustrative purposes only and are not intended to limit the scope of the application. For example, the ME 112 may include more components, such as a power supply, and/or a Global Positioning System (GPS) device, wherein the power supply may be a mobile/replaceable battery providing power to all the other components of the ME 112, and the GPS device may provide the GPS information of the ME 112 for use by some location-based services or applications. Alternatively, the ME 112 may include fewer components. For example, the ME 112 may not include the display device 40 and/or the I/O device 50.

Figure 4:
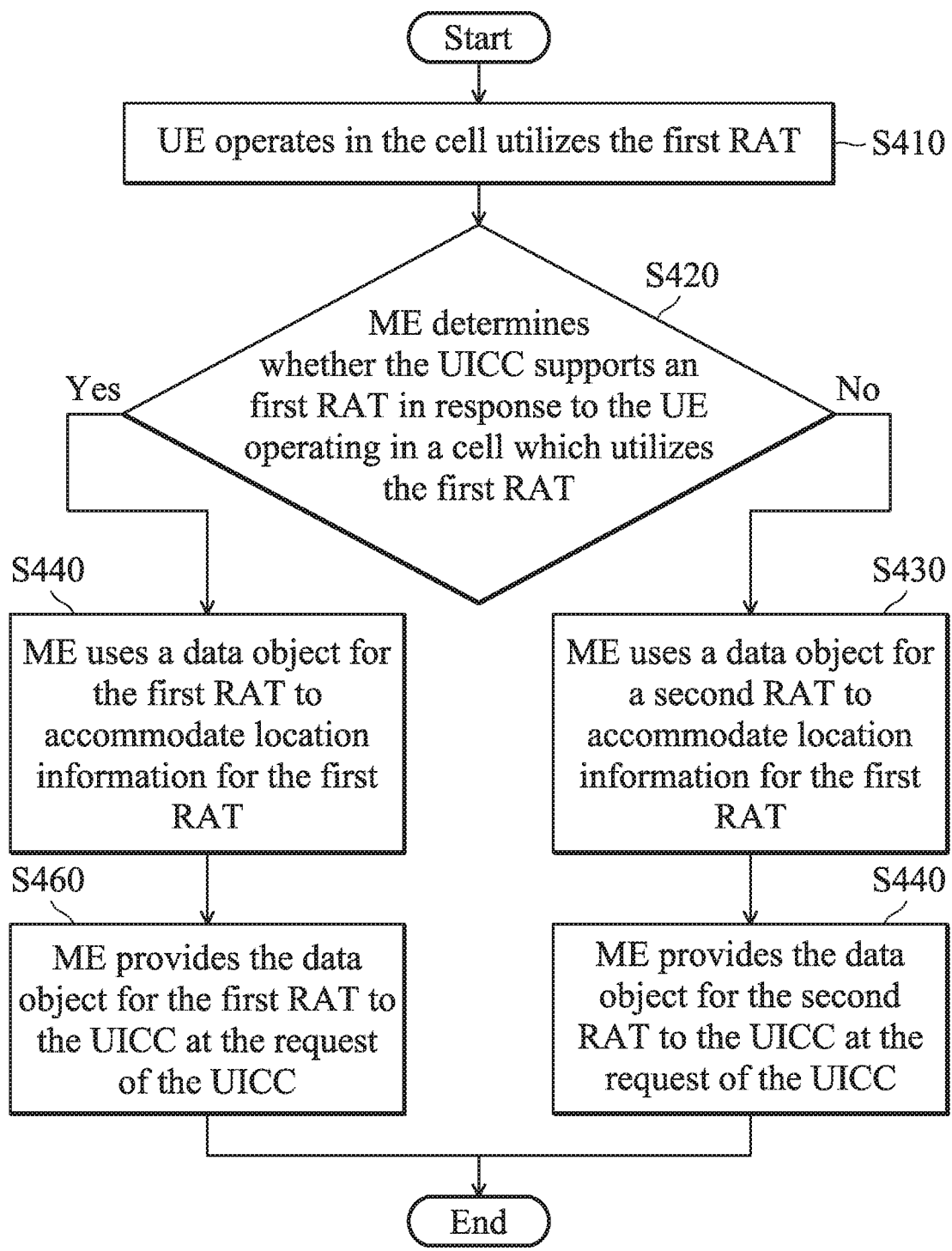
FIG. 4 is a flow chart illustrating the method for handling location information according to an embodiment of the application.

FIG. 4 is a flow chart illustrating the method for handling location information according to an embodiment of the application.

In this embodiment, the method for handling location information is executed by a UE (e.g., the UE 110) which includes an UICC (e.g., the UICC 111) and an ME (e.g., the ME 112).

To begin with, the UE operates in the cell utilizes a first RAT (e.g., the 5G NR technology) (step S410). In other words, the UE camps on a cell which utilizes the first RAT and registers with the service network to which the cell belongs.

Next, the ME determines whether the UICC supports the first RAT in response to the UE operating in a cell which utilizes the first RAT (step S420).

Specifically, the ME may determine whether the UICC supports the first RAT, by checking an EF in the UICC, which is used for storing a USIM service table, wherein the USIM service table may indicate which services are available.

In one embodiment, the first RAT may be the 5G NR technology, and the EF for storing the USIM service table may be the EFusT defined in the 3GPP Technical Specification (TS) 31.102, wherein the 5G specific service may be any one of service n° 122 to service n° 130.

For the convenience of reference, Table 1 below shows an example of the EF for storing the USIM service table.

TABLE 1

| Identifier: '6F38' | Structure: transparent | | Mandatory |
|---|---|---|---|
| SFI: '04' | | | |
| File size: X bytes, (X ≥ 1) | Update activity: low | | |
| Access Conditions: | | | |
| READ | PIN | | |
| UPDATE | ADM | | |
| DEACTIVATE | ADM | | |
| ACTIVATE | ADM | | |
| Bytes | Description | M/O | Length |
| 1 | Services n° 1 to n° 8 | M | 1 byte |
| 2 | Services n° 9 to n° 16 | O | 1 byte |
| 3 | Services n° 17 to n° 24 | O | 1 byte |
| 4 | Services n° 25 to n° 32 | O | 1 byte |
| etc. | | | |
| X | Services n° (8X-7) to n° (8X) | O | 1 byte |

For example, if the bit corresponding to service n° 122 is set to TRUE, it means that 5GS Mobility Management Information is available and accordingly, it may be determined that the UICC supports the 5G NR technology. Otherwise, if the bit corresponding to service n° 122 is set to FALSE, it means that 5GS Mobility Management Information is not available and accordingly, it may be determined that the UICC does not support the 5G NR technology.

Alternatively, if the bit corresponding to service n° 123 is set to TRUE, it means that 5G Security Parameters is available and accordingly, it may be determined that the UICC supports the 5G NR technology. Otherwise, if the bit corresponding to service n° 123 is set to FALSE, it means that 5G Security Parameters is not available and accordingly, it may be determined that the UICC does not support the 5G NR technology.

Alternatively, if the bit corresponding to service n° 129 is set to TRUE, it means that 5GS Operator PLMN List is available and accordingly, it may be determined that the UICC supports the 5G NR technology. Otherwise, if the bit corresponding to service n° 129 is set to FALSE, it means that 5GS Operator PLMN List is not available and accordingly, it may be determined that the UICC does not support the 5G NR technology.

Subsequent to step S420, if the UICC does not support the first RAT, the ME uses a data object for a second RAT to accommodate location information for the first RAT (step S430).

In one embodiment, the second RAT may be a legacy RAT to the first RAT (i.e., the first RAT is more advanced than the second RAT).

Specifically, step S430 may be performed by transforming the location information for the first RAT to meet a format of location information for the second RAT. For example, the transforming of the location information may refer to truncating the location information for the first RAT to meet the format of location information for the second RAT.

In one embodiment, when the first RAT and the second RAT are the 5G NR technology and the 4G LTE technology, respectively, the location information for the first RAT may refer to the location information for NG-RAN, and the location information for the second RAT may refer to the location information for E-UTRAN, according to the 3GPP TS 31.111. Table 2 below shows an example of a data object for containing the location information for E-UTRAN.

TABLE 2

| Byte(s) | Description | Length |
|---|---|---|
| 1 | Location Information tag | 1 |
| 2 | Length = '09' or '05' (see Note) | 1 |
| 3-5 | Mobile Country & Network Codes (MCC & MNC) | 3 |
| 6-7 | Tracking Area Code (TAC) | 2 |
| 8-11 | E-UTRAN Cell Identifier (ECI) (see Note) | 4 |

For example, the truncating of the location information for NG-RAN to meet the format of the location information for E-UTRAN may be realized by coding 16 least significant bits of a Tracking Area Code (TAC) of the location information for NG-RAN in bytes 6 and 7 of the location information for E-UTRAN, and coding 32 least significant bits of a NR Cell Identifier (NCI) of the location information for NG-RAN in bytes 8 to 11 of the location information for E-UTRAN.

To further clarify, the most significant bit of the 16 least significant bits of the TAC is coded on the most significant bit of byte 6 of the location information for E-UTRAN, and the least significant bit of the 16 least significant bits of the TAC is coded on the least significant bit of byte 7 of the location information for E-UTRAN. Similarly, the most significant bit of the 32 least significant bits of the NCI is coded on the most significant bit of byte 8 of the location information for E-UTRAN, and the least significant bit of the 32 least significant bits of the NCI is coded on the least significant bit of byte 11 of the location information for E-UTRAN.

It should be understood that the aforementioned example of truncating the location information for NG-RAN to meet the format of the location information for E-UTRAN is for illustrative purposes only and is not intended to limit the scope of the application.

Subsequent to step S430, the ME provides the data object for the second RAT to the UICC at the request of the UICC (step S440), and the method ends.

In another embodiment, the ME may further provides a predefined value or parameter, along with the data object for the second RAT, to indicate to the UICC that the UE is operating in a cell which utilizes the first RAT rather than a cell which utilizes the second RAT.

Back to step S420, if the UICC supports the first RAT, the ME uses a data object for the first RAT to accommodate location information for the first RAT (step S450).

In one embodiment, when the first RAT is the 5G NR technology, the location information for the first RAT may refer to the location information for NG-RAN according to the 3GPP TS 31.111. Table 3 below shows an example of a data object for containing the location information for NG-RAN.

TABLE 3

| Byte(s) | Description | Length |
|---|---|---|
| 1 | Location Information tag | 1 |
| 2 | Length = '0B' or '03' (see Note) | 1 |

TABLE 3-continued

| Byte(s) | Description | Length |
|---|---|---|
| 3-5 | Mobile Country & Network Codes (MCC & MNC) | 3 |
| 6-8 | Tracking Area Code (TAC) (see Note) | 3 |
| 9-13 | NR Cell Identifier (NCI) | 5 |

Subsequent to step S450, the ME provides the data object for the first RAT to the UICC at the request of the UICC (step S460), and the method ends.

In view of the forgoing embodiments, it will be appreciated that the present application realizes enablement of using a non-5G UICC (e.g., USIM) in a 5G-capable UE, by providing explicit handling of the 5G specific information. Advantageously, failures of interoperability between the ME and the UICC in the 5G-capable UE may be avoided.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A User Equipment (UE), comprising:
a Universal Integrated Circuit Card (UICC); and
a Mobile Equipment (ME), coupled to the UICC, and configured to determine whether the UICC supports a first Radio Access Technology (RAT) in response to the UE operating in a cell which utilizes the first RAT, and use a data object for a second RAT to accommodate location information for the first RAT in response to the UICC not supporting the first RAT.

2. The UE of claim 1, wherein the ME is further configured to provide the data object for the second RAT to the UICC at a request of the UICC, after using the data object for the second RAT to accommodate the location information for the first RAT.

3. The UE of claim 2, wherein the ME is further configured to provide a predefined value or parameter, along with the data object for the second RAT, to indicate to the UICC that the UE is operating in a cell which utilizes the first RAT rather than a cell which utilizes the second RAT.

4. The UE of claim 1, wherein the using of the data object for the second RAT to accommodate the location information for the first RAT comprises:
transforming the location information for the first RAT to meet a format of location information for the second RAT.

5. The UE of claim 4, wherein the transforming of the location information for the first RAT to meet the format of location information for the second RAT comprises:
truncating the location information for the first RAT to meet the format of location information for the second RAT.

6. The UE of claim 5, wherein, when the first RAT and the second RAT are a 3rd Generation Partnership Project (3GPP) 5G technology and a 3GPP 4G technology, respectively, and the truncating of the location information for the first RAT to meet the format of location information for the second RAT comprises:
coding 16 least significant bits of a Tracking Area Code (TAC) of the location information for the first RAT in bytes 6 and 7 of the location information for the second RAT; and
coding 32 least significant bits of a NR Cell Identifier (NCI) of the location information for the first RAT in bytes 8 to 11 of the location information for the second RAT.

7. The UE of claim 6, wherein the most significant bit of the 16 least significant bits of the TAC is coded on the most significant bit of byte 6 of the location information for the second RAT, and the least significant bit of the 16 least significant bits of the TAC is coded on the least significant bit of byte 7 of the location information for the second RAT.

8. The UE of claim 6, wherein the most significant bit of the 32 least significant bits of the NCI is coded on the most significant bit of byte 8 of the location information for the second RAT, and the least significant bit of the 32 least significant bits of the NCI is coded on the least significant bit of byte 11 of the location information for the second RAT.

9. The UE of claim 1, wherein the UICC comprises an Elementary File (EF) for storing a USIM service table, and the determining of whether the UICC supports the first RAT comprises the following when the first RAT is a 3GPP 5G technology:
determining whether a 5G specific service is indicated as available in the USIM service table;
determining that the UICC supports the first RAT in response to the 5G specific service being indicated as available in the USIM service table; and
determining that the UICC does not support the first RAT in response to the 5G specific service not being indicated as available in the USIM service table.

10. The UE of claim 9, wherein the 5G specific service is one of service n° 122 to service n° 130 according to the 3GPP Technical Specification (TS) 31.102.

11. A method for handling location information, executed by a UE comprising a UICC and an ME, the method comprising:
determining, by the ME, whether the UICC supports a first RAT in response to the UE operating in a cell which utilizes the first RAT; and
using, by the ME, a data object for a second RAT to accommodate location information for the first RAT in response to the UICC not supporting the first RAT.

12. The method of claim 11, further comprising:
providing, by the ME, the data object for the second RAT to the UICC at a request of the UICC, after using the data object for the second RAT to accommodate the location information for the first RAT.

13. The method of claim 12, further comprising:
providing, by the ME, a predefined value or parameter, along with the data object for the second RAT, to indicate to the UICC that the UE is operating in a cell which utilizes the first RAT rather than a cell which utilizes the second RAT.

14. The method of claim 11, wherein the using of the data object for the second RAT to accommodate the location information for the first RAT comprises:
transforming the location information for the first RAT to meet a format of location information for the second RAT.

15. The method of claim 14, wherein the transforming of the data object for the second RAT to accommodate the location information for the first RAT comprises:
truncating the location information for the first RAT to meet a format of location information for the second RAT.

16. The method of claim 15, wherein, when the first RAT and the second RAT are a 3GPP 5G technology and a 3GPP 4G technology, respectively, and the truncating of the location information for the first RAT to meet the format of location information for the second RAT comprises:

coding 16 least significant bits of a Tracking Area Code (TAC) of the location information for the first RAT in bytes 6 and 7 of the location information for the second RAT; and coding 32 least significant bits of a NR Cell Identifier (NCI) of the location information for the first RAT in bytes 8 to 11 of the location information for the second RAT.

17. The method of claim 16, wherein the most significant bit of the 16 least significant bits of the TAC is coded on the most significant bit of byte 6 of the location information for the second RAT, and the least significant bit of the 16 least significant bits of the TAC is coded on the least significant bit of byte 7 of the location information for the second RAT.

18. The method of claim 16, wherein the most significant bit of the 32 least significant bits of the NCI is coded on the most significant bit of byte 8 of the location information for the second RAT, and the least significant bit of the 32 least significant bits of the NCI is coded on the least significant bit of byte 11 of the location information for the second RAT.

19. The method of claim 11, wherein the UICC comprises an EF for storing a USIM service table, and the determining of whether the UICC supports the first RAT comprises the following when the first RAT is a 3GPP 5G technology:

determining whether a 5G specific service is indicated as available in the USIM service table;

determining that the UICC supports the first RAT in response to the 5G specific service being indicated as available in the USIM service table; and determining that the UICC does not support the first RAT in response to the 5G specific service not being indicated as available in the USIM service table.

20. The method of claim 19, wherein the 5G specific service is one of service n° 122 to service n° 130 according to the 3GPP TS 31.102.

* * * * *